US011214170B2

(12) United States Patent
Tanaka (10) Patent No.: US 11,214,170 B2
(45) Date of Patent: Jan. 4, 2022

(54) POWER SUPPLY SYSTEM AND OPERATION METHOD THEREOF

(71) Applicant: NISSAN MOTOR CO., LTD., Yokohama (JP)

(72) Inventor: Koichi Tanaka, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 37 days.

(21) Appl. No.: 16/637,821

(22) PCT Filed: Aug. 14, 2017

(86) PCT No.: PCT/JP2017/029320
§ 371 (c)(1),
(2) Date: Feb. 10, 2020

(87) PCT Pub. No.: WO2019/035173
PCT Pub. Date: Feb. 21, 2019

(65) Prior Publication Data
US 2020/0164766 A1    May 28, 2020

(51) Int. Cl.
*B60L 58/20*        (2019.01)
*B60L 3/00*         (2019.01)

(52) U.S. Cl.
CPC .............. *B60L 58/20* (2019.02); *B60L 3/0046* (2013.01); *B60L 2210/10* (2013.01)

(58) Field of Classification Search
CPC .... B60L 58/20; B60L 3/0046; B60L 2210/10; B60L 1/003; B60L 58/40; B60L 58/10; B60L 58/12; B60L 58/18; B60L 58/19; B60L 58/22; B60L 58/30; B60L 58/31; B60L 53/10; B60L 53/54; B60L 53/67; B60L 50/70; B60L 50/71; B60L 50/72; B60L 50/75; Y02E 60/50; Y02T 10/70; Y02T 90/40; H01M 8/04
See application file for complete search history.

(56) References Cited

U.S. PATENT DOCUMENTS

| 2003/0129459 A1* | 7/2003 | Ovshinsky .............. H01M 4/90 429/9 |
| 2009/0001926 A1 | 1/2009 | Sato |
| 2012/0053766 A1* | 3/2012 | Ham ....................... B60L 58/31 701/22 |
| 2013/0065089 A1 | 3/2013 | Kazuno et al. |

FOREIGN PATENT DOCUMENTS

| JP | 2007-228753 A | 9/2007 |
| JP | 2008-17576 A | 1/2008 |
| JP | 2009-37828 A | 2/2009 |

* cited by examiner

*Primary Examiner* — John W Poos
*Assistant Examiner* — Alex W Lam
(74) *Attorney, Agent, or Firm* — Foley & Lardner LLP (57) ABSTRACT

A power supply system P is provided with a fuel cell 1 and a battery unit 2 connected to the fuel cell 1. The battery unit 2 is provided with a first battery 21 connected to the fuel cell 1 so as to supply power to an auxiliary machine 12 of the fuel cell 1 and to be able to be charged with generated power of the fuel cell 1, a second battery 22 connected to the auxiliary machine 12 of the fuel cell 1 through a path p4 different from that of the first battery 21 so as to be able to supply power, and switchers R1, R2 configured to switch the power supply source to the auxiliary machine 12 of the fuel cell 1 between the first battery 21 and the second battery 22.

14 Claims, 5 Drawing Sheets

POWER SUPPLY SYSTEM AND OPERATION METHOD THEREOF

TECHNICAL FIELD

The present invention relates to a power supply system provided with a battery and a fuel cell as power supply sources and an operation method thereof.

BACKGROUND ART

JP2007-228753 discloses an electric vehicle configured to be provided with a high voltage battery in which a traveling motor is a power supply target and a solar cell as power sources and to be able to charge the high voltage battery with generated power of the solar cell. This system is provided with a monitoring unit configured to monitor the state of the high voltage battery. In the monitoring unit, a diode is connected to an electric power source terminal. The monitoring unit operates by receiving the power supply from any one of two electric power source systems of the solar cell or a low voltage battery. Specifically, when the high voltage battery is charged with the generated power of the solar cell, the monitoring unit receives the supply of the generated power of the solar cell through a DC/DC converter for low voltage electric power source, when the DC/DC converter for low voltage electric power source stops, the monitoring unit receives the supply of an electric power source voltage from the low voltage battery (Paragraphs 0032, 0033).

SUMMARY OF INVENTION

In JP2007-228753, a switching unit of the electric power source systems is configured by a pair of diodes. However, the switching unit merely switches the electric power source systems in which the monitoring unit is set as the power supply target. When the fuel cell is provided as the power source, it is necessary to examine the securement of the electric power source to an auxiliary machine of the fuel cell. This is because power needs to be supplied from the outside (not generated power of the fuel cell itself) to the auxiliary machine of the fuel cell until autonomous power supply becomes possible after starting the fuel cell.

It is an object of the present invention to provide a power supply system considering the above-described problem.

In one aspect, the present invention provides a power supply system including a fuel cell, a battery unit connected to the fuel cell. In the present aspect, the battery unit is provided with a first battery connected to the fuel cell so as to supply power to an auxiliary machine of the fuel cell and to be able to be charged with generated power of the fuel cell, a second battery connected to the auxiliary machine of the fuel cell so as to be able to supply power through a path different from a path of the first battery, and a switcher configured to switch a power supply source to the auxiliary machine of the fuel cell between the first battery and the second battery.

The present invention provides an operation method for a power supply system in another aspect.

DESCRIPTION OF EMBODIMENTS

Hereinafter, embodiments of the present invention are described with reference to the drawings.

First Embodiment

Figure 1:
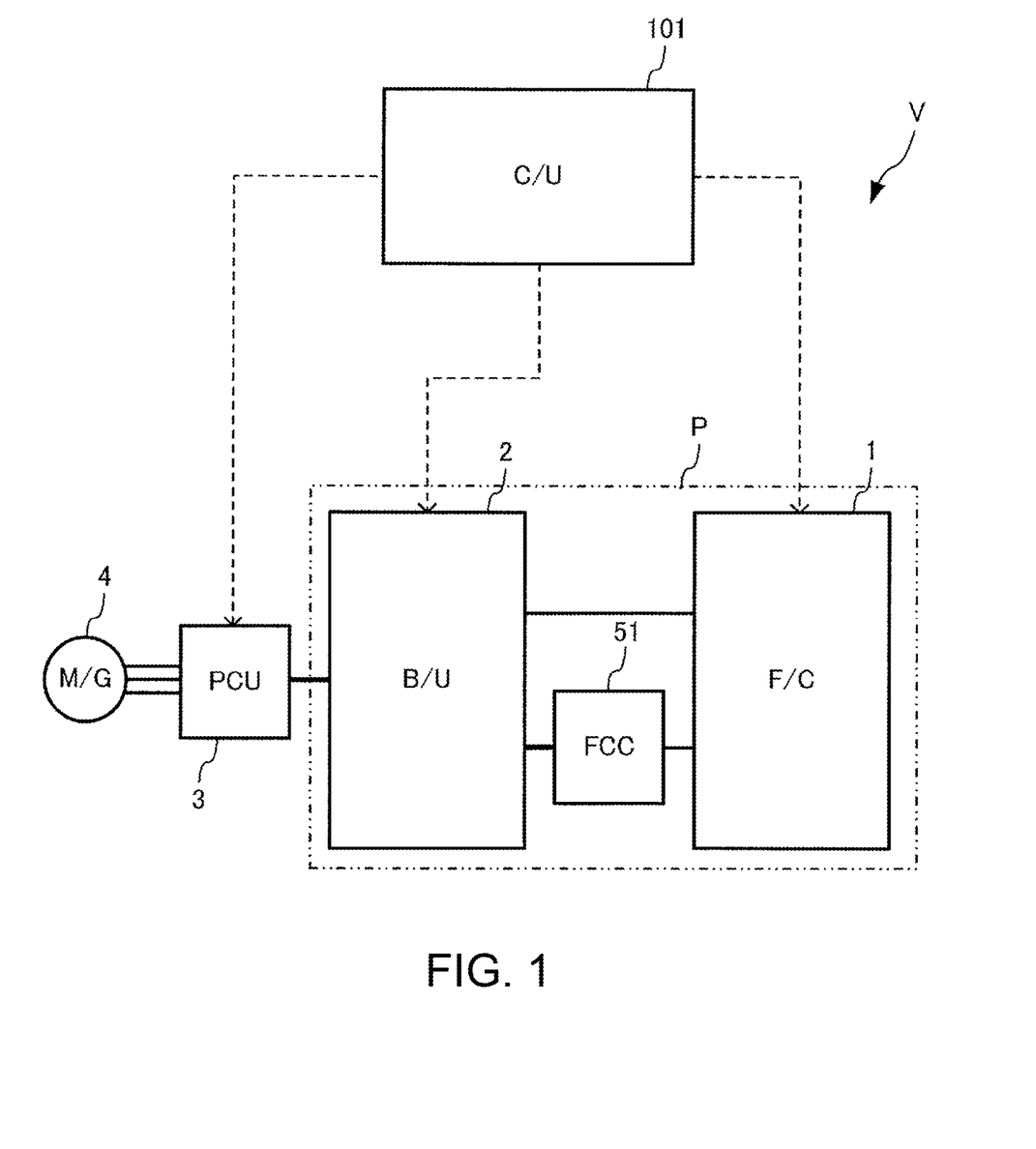
FIG. 1 is a schematic view illustrating the configuration of a vehicle driving system provided with a power supply system according to a first embodiment of the present invention.

FIG. 1 illustrates a rough configuration of a driving system (hereinafter referred to as a "vehicle driving system") V of an electric vehicle (hereinafter simply referred to as a "vehicle") provided with a power supply system P according to a first embodiment of the present invention.

When roughly divided, the vehicle driving system V is provided with the power supply system P, a power control unit 3, and a traveling motor 4 and drives the traveling motor 4 through the power control unit 3 by an output of the power supply system P. The power control unit 3 contains an inverter and converts a direct current output from a battery unit 2 to a three-phase alternating current, and then supplies the same to the traveling motor 4. The traveling motor 4 is connected to driving wheels of the vehicle through a differential gear which is not illustrated and rotates the driving wheels to propel the vehicle. The traveling motor 4 is a motor generator operable as a motor or also as a generator and can operate as a generator in braking travel of the vehicle to regenerate power.

In this embodiment, the power supply system P is provided with a fuel cell 1 and the battery unit 2 as power sources. Herein, the term "unit" in the battery unit 2 merely refers to a conceptual set and does not mean physical integrity. In other words, in the battery unit 2, constituent components are not required to be disposed together close to each other. While one constituent component (for example, one of two batteries 21, 22) may be disposed inside a bonnet of the vehicle, a different constituent component (for example, the other battery) is disposed adjacent to a trunk room in a vehicle rear portion.

The fuel cell 1 is a solid oxide fuel cell (SOFC), for example. The fuel cell 1 may be a fuel cell of another type. In this embodiment, the fuel cell 1 is configured by laminating a plurality of fuel cell unit cells and operates using an oxygen-containing fuel (for example, ethanol) as a raw fuel. While hydrogen generated by a steam reforming reaction of ethanol is supplied as a fuel to an anode electrode of the fuel cell 1, the air (specifically oxygen) in the atmosphere is supplied as an oxidizer gas to a cathode electrode. When the fuel cell 1 is the solid oxide type, reactions relating to the power generation in the anode electrode and the cathode electrode can be individually expressed by the following formulae.

$$\text{Anode electrode: } 2H_2 + 4O^{2-} \rightarrow 2H_2O + 4e^- \tag{1.1}$$

$$\text{Cathode electrode: } O_2 + 4e^- \rightarrow 2O^{2-} \tag{1.2}$$

While the battery unit 2 supplies an output thereof to the traveling motor 4 through the power control unit 3 as described above, the battery unit 2 receives the supply of power generated by the fuel cell 1 and stores the power in the batteries. In this embodiment, a unidirectional DC/DC converter 51 is interposed in a power path for charging connecting the fuel cell 1 and the battery unit 2. The converter 51 is a boost converter. The battery unit 2 receives the supply of power after boosted by the converter 51 from the fuel cell 1 as charge power. In this embodiment, the converter 51 is an insulation type.

Furthermore, the battery unit 2 is connected to the fuel cell 1 through a power path for power supply and supplies power to various auxiliary machines required for the working of the fuel cell 1 through the path as described later. For example, the auxiliary machines of the fuel cell 1 are a sensor, an actuator, a heater, a pump, and a blower. As the sensor, a flow rate sensor configured to detect the flow rate of a raw fuel or an oxidizer gas, a temperature sensor configured to detect the temperature of the fuel cell 1, a liquid level sensor configured to detect the amount of a raw fuel remaining in a fuel tank, and the like can be mentioned. The blower or an air compressor is attached to the vicinity of an open end of an oxidizer gas supply passage (cathode gas passage) and sucks the air in the atmosphere into the cathode gas passage.

The operations of the fuel cell 1, the battery unit 2, the power control unit 3, and the like are controlled by a controller 101.

Figure 2:
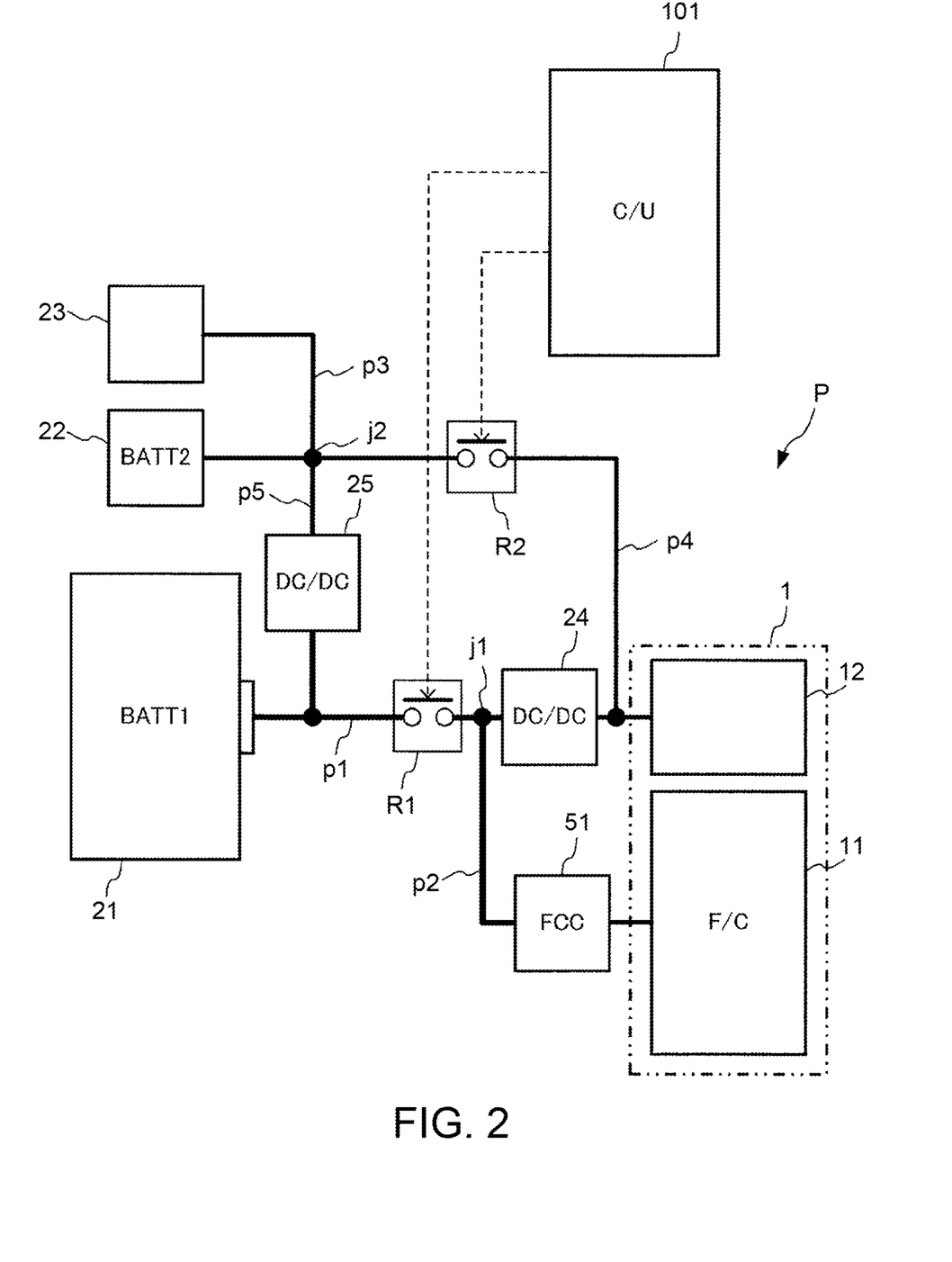
FIG. 2 is a schematic view illustrating the configuration of the power supply system according to the same embodiment as above.

FIG. 2 illustrates a rough configuration of the power supply system P.

In this embodiment, the power supply system P is provided with the fuel cell 1 and the battery unit 2.

FIG. 2 conceptually illustrates the fuel cell 1 by the chain double-dashed line. When roughly divided, the fuel cell 1 contains a power generator 11 which is a laminate of fuel cell unit cells and an auxiliary machine (hereinafter, which is simply referred to as an "auxiliary machine" to be distinguished from a vehicle auxiliary machine 23) 12 required for the working of the fuel cell 1.

The battery unit 2 is provided with a plurality of batteries and is provided with the two batteries 21, 22 in this embodiment. One is the high voltage battery 21 having a relatively high voltage. In this embodiment, the high voltage battery 21 has a 400 V terminal voltage, and thus is particularly referred to as a "high power battery". The other one is the low voltage battery 22 having a voltage lower than that of the high voltage battery 21. In this embodiment, the low voltage battery 22 has a 14 V terminal voltage and is particularly referred to as a "low power battery" in contrast with the high power battery 21.

The high power battery 21 stores power supplied to the traveling motor 4. The low power battery 22 stores power supplied to the vehicle auxiliary machine 23 other than the traveling motor 4. The vehicle auxiliary machine 23 is a vehicle interior electrical component, such as an audio, for example. The high power battery 21 is chargeable by being connected to a quick charger and can be charged with power regenerated by the traveling motor 4 in braking travel as described later.

The high power battery 21 is connected to the auxiliary machine 12 of the fuel cell 1 through a first power supply path p1 and can supply power to the auxiliary machine 12 through the first power supply path p1. In the first power supply path p1, a DC/DC converter 24 is interposed and a voltage (14 V in this embodiment) after stepped-down by the converter 24 is applied to the auxiliary machine 12 from the high power battery 21.

Meanwhile, the high power battery 21 is connected to the fuel cell 1 so as to be able to be charged with generated power of the fuel cell 1. Specifically, the power generator 11 of the fuel cell 1 and the first power supply path p1 are connected through a power path p2 in which the converter 51 is interposed. Thus, a voltage (400 V in this embodiment) after boosted by the converter 51 is applied to the first power supply path p1 from the fuel cell 1, and further applied to the high power battery 21 through the first power supply path p1. Herein, the voltage applied to the first power supply path p1 is stepped-down by the converter 24, and then applied to the auxiliary machine 12. Thus, autonomous power supply of the fuel cell 1 to the auxiliary machine 12 becomes possible.

While the low power battery 22 is connected to the vehicle auxiliary machine 23 through a power path p3, the low power battery 22 is connected to the auxiliary machine 12 of the fuel cell 1 through a second power supply path p4. In this embodiment, the second power supply path p4 is connected to the first power supply path p1 between the converter 24 and the auxiliary machine 12 of the fuel cell 1, and thus the low power battery 22 can supply power to the auxiliary machine 12 through the second power supply path p4 different from the first power supply path p1. Furthermore, the first power supply path p1 and the second power supply path p4 are connected through a power path p5. The low power battery 22 is in a state of being able to be charged with discharge power of the high power battery 21 through the path p5. In the power path p5 connecting the first power supply path p1 and the second power supply path p4, a DC/DC converter 25 configured to convert the voltage (for example, 400 V) of the high power battery 21 to a charge voltage (for example, 14 V) of the low power battery 22 is interposed. The converter 25 functions as an isolator configured to electrically isolate the low power battery 22 and the vehicle auxiliary machine 23 from the other constituent components of the system, i.e., high voltage system, at the stop of the power supply system P (for example, in the stop of the operation of the vehicle).

In addition thereto, the power supply system P is provided with switchers R1, R2 configured to switch the power supply source to the auxiliary machine 12 of the fuel cell 1 between the high power battery 21 and the low power battery 22.

In this embodiment, the switchers R1, R2 are configured by a first relay R1 interposed in the first power supply path p1 and a second relay R2 interposed in the second power supply path p4, respectively. In this embodiment, the first and second relays R1, R2 are configured as different units but can be configured as one unit without being limited thereto.

The first relay R1 provided in the first power supply path p1 is disposed between the high power battery 21 and the converter 24, in other words, disposed on the upstream side of the converter 24 with respect to the direction of a current in which the high power battery 21 is set as the power source. Furthermore, the first relay R1 is disposed on the upstream side relative to a connecting point j1 between the first power supply path p1 and the power path p2 with respect to the direction of a current in which the high power battery 21 is set as the power source. The second relay R2 is disposed on the downstream side relative to a connecting point j2 between the second power supply path p4 and the power path p5 with respect to the direction of a current in which the low power battery 22 is set as the power source.

The controller 101 is configured as an electronic control unit and contains a microcomputer provided with a central processing unit (CPU), various storage devices, such as a ROM and a RAM, an I/O interface, and the like. The controller 101 outputs control instructions to the first and second relays R1, R2 besides the DC/DC converters 24, 25, and 51 and controls the operations thereof.

In this embodiment, a "first battery" is configured by the high power battery 21, a "second battery" is configured by the low power battery 22, a "first voltage converter" is configured by the DC/DC converter 25, and a "second voltage converter" is configured by the DC/DC converter 24. The "switcher" is configured by the first and second relays R1, R2 and a "controller" is configured by the controller 101. The "battery unit" according to this embodiment is configured by the high power battery 21, the low power battery 22, the converters 24, 25, and the first and second relays R1, R2.

Figure 3:
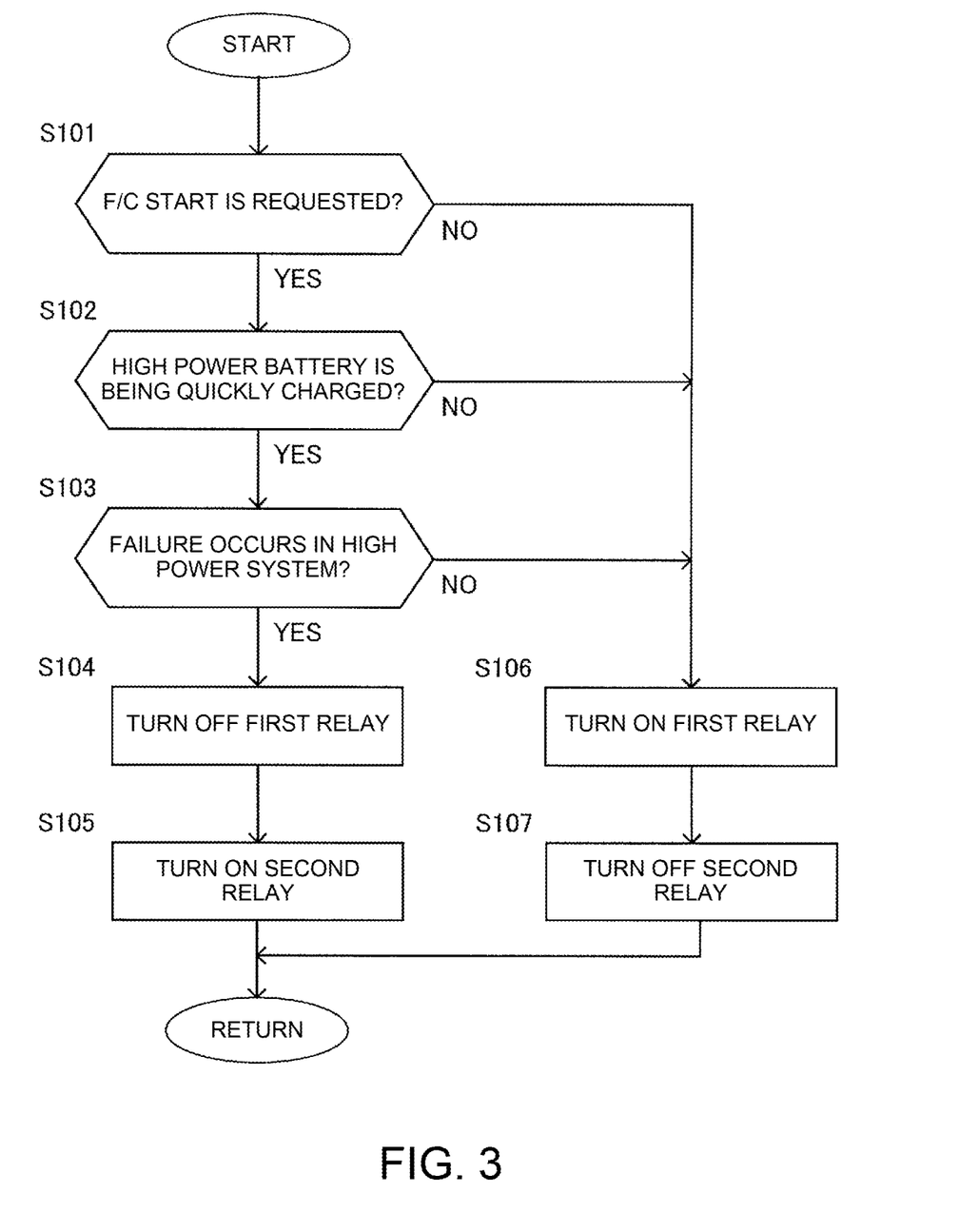
FIG. 3 is a flow chart illustrating the basic flow of power source switching control according to the same embodiment as above.

FIG. 3 illustrates the basic flow of the power source switching control according to this embodiment by the flow chart. The controller 101 is programmed to repeatedly carry out the control illustrated in the figure every predetermined time during the operation of the power supply system P (for example, in vehicle driving). The program of this control may be executed as interruption processing when the start of the fuel cell 1 is requested without being limited thereto.

In this embodiment, the controller 101 determines whether power supply to the auxiliary machine 12 of the fuel cell 1 from the high power battery 21 is possible. When the power supply is possible, the high power battery 21 is selected as the power supply source. When the power supply is not possible, the low power battery 22 is selected as the power supply source. When the high power battery 21 is set as the power source, the controller 101 outputs an ON signal to the first relay R1 and outputs an OFF signal to the second relay R2. On the other hand, when the low power battery 22 is set as the power source, the controller 101 outputs an OFF signal to the first relay R1 and outputs an ON signal to the second relay R2.

Moving on to the description of the flow chart, it is determined in S101 whether the fuel cell 1 is in a start state. The determination whether the fuel cell 1 is in the start state is performed by detecting the charge amount of the high power battery 21, and then determining whether the detected charge amount is less than the predetermined amount, for example. When the charge amount of the high power battery 21 is less than the predetermined amount and is insufficient, the high power battery 21 is charged with the generated power of the fuel cell 1, and therefore the fuel cell 1 is started. The fuel cell 1 is not in a state where the autonomous power supply is possible at the start thereof. When the fuel cell 1 is in the start state, processing proceeds to S102. When not, processing proceeds to S106.

In S102, it is determined whether the high power battery 21 is in a quick charge state. This determination is performed by determining whether a plug of a quick charger is inserted into a quick charge connector (for example, provided in a rear portion or the side surface of the vehicle) of the high power battery 21, for example. When the high power battery 21 is in the quick charge state, processing proceeds to S103. When not, processing proceeds to S106.

In S103, it is determined whether a failure of the high power battery 21 or the high voltage system occurs. This determination is embodied by determining whether an abnormality or a trouble occurs in the power supply using the high power battery 21 as the power source and is performed by determining whether disconnection occurs in the first power supply path p1 or an abnormality or a breakdown occurs in the converter 24 besides in the high power battery 21 itself. When a failure occurs in the high power battery 21, processing proceeds to S104. When not, processing proceeds to S106.

In S104, the first relay R1 is brought into an OFF state.
In S105, the second relay R2 is brought into an ON state.
In S106, the first relay R1 is brought into an ON state.
In S107, the second relay R2 is brought into an OFF state.

Thus, the controller 101 controls the operation of the first and second relays R1, R2 at the start of the fuel cell 1. While the low power battery 22 is set as the power source to the auxiliary machine 12 of the fuel cell 1 by the processing of S104 and 105, the high power battery 21 is set as the power source to the auxiliary machine 12 of the fuel cell 1 by the processing of S106 and 107.

The power supply system P according to this embodiment is configured as described above. The operations and the effects obtained by this embodiment are described below.

(Explanation of Operations and Effects)

First, the power supply source to the auxiliary machine 12 of the fuel cell 1 is made switchable between the high power battery 21 and the low power battery 22, whereby, even in a state where power cannot be supplied from the high power battery 21, e.g., during charging of the high power battery 21 or at the occurrence of a failure in the high power battery 21, power supply from the low power battery 22 becomes possible. Thus, the power source to the auxiliary machine 12 of the fuel cell 1 can be secured regardless of the state of the high power battery 21.

Herein, in this embodiment, the state of the high power battery 21 or the high voltage system is determined, and then, when the power supply to the auxiliary machine 12 of the fuel cell 1 from the high power battery 21 is not possible, the power source is switched to the low power battery 22, whereby the power source can be accurately switched according to the state of the high power battery 21. When such a determination is performed at the start of the fuel cell 1, so that the power source needs to be switched, the low power battery 22 is set as the power source, whereby the power source until autonomous power supply of the fuel cell 1 becomes possible can be secured. Therefore, the fuel cell 1 can be stopped at arbitrary timing, and then the start and the warm-up can be carried out.

Furthermore, according to this embodiment, the starting properties of the fuel cell 1 can be secured to an electric vehicle already provided with the high voltage battery or the high power battery 21 and the low voltage battery or the low power battery 22 by existing power accumulation equipment without depending on a special low voltage battery aiming at the securement of the power source to the auxiliary machine 12. Therefore, an increase in the cost in the entire system can be suppressed and an increase in the size can be suppressed.

Second, by connecting the low power battery 22 to the high power battery 21 so as to be able to be charged with the high power battery 21, the vehicle auxiliary machine 23 can be stably operated. Herein, by installing the converter 25 on the power path p5 connecting the first and second batteries 21, 22 to each other, the power supply from the high power battery 21 to the low power battery 22 is realized and the low power battery 22 can be isolated from the high voltage system, so that influence caused by excessive discharge of the low power battery 22 during stop of the driving of the vehicle on the high voltage system can be suppressed, for example.

In this embodiment, although the power source switching control (FIG. 3) is carried out at the start of the fuel cell 1, a configuration may be acceptable, without being limited thereto, in which the state of the high power battery 21 or the high voltage system is always monitored during the operation of the power supply system P, and when it is determined that the power supply from the high power battery 21 to the auxiliary machine 12 of the fuel cell 1 is not possible, the power source to the auxiliary machine 12 is switched from the high power battery 21 to the low power battery 22. Thus, even when the generated power of the fuel cell 1 does not satisfy power required for the drive of the auxiliary machine 12, the working of the fuel cell 1 can be stably continued.

Furthermore, in this embodiment, it is determined whether the power supply to the auxiliary machine 12 of the fuel cell 1 from the high power battery 21 is possible by the controller 101, and, when it is determined that the power supply is not possible, the power source to the auxiliary machine 12 is switched to the low power battery 22. However, a configuration may be acceptable in which, when a plug of a quick charger is inserted into a quick charge connector of the high power battery 21, the power source is automatically switched because the power supply by the high power battery 21 is not possible without depending on a special process of the determination, for example. In the high power battery 21, the connection to the first power supply path p1 is blocked by a relay (not illustrated) provided in itself at the quick charge.

Hereinafter, the other embodiments of the present invention are described.

Second Embodiment

Figure 4:
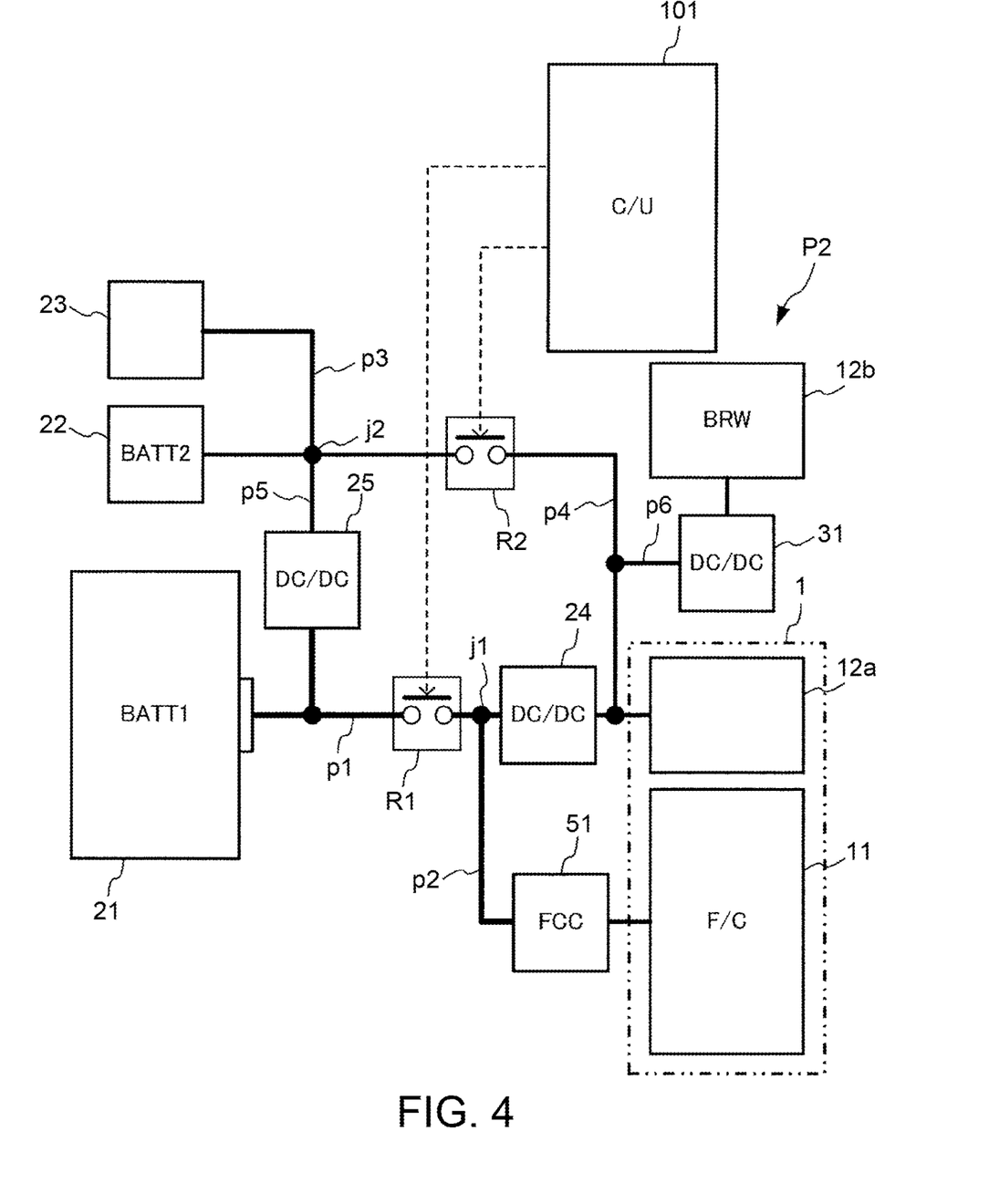
FIG. 4 is a schematic view illustrating the configuration of a power supply system according to a second embodiment of the present invention.

FIG. 4 is a schematic view illustrating the configuration of a power supply system P2 according to a second embodiment of the present invention. Herein, components or portions exhibiting the same functions as those in the first embodiment are designated by the same reference numerals as those in FIG. 2 and a detailed description thereof is omitted in order to avoid a redundant description (The same applies also to a third embodiment).

The power supply system P2 is provided with a plurality of auxiliary machines 12a and 12b configured to operate at different voltages as the auxiliary machine 12 of the fuel cell 1. The auxiliary machine 12a is an auxiliary machine configured to operate at a relatively low voltage (for example, 14 V) and is a sensor, an actuator, and the like required for the working of the fuel cell 1, for example. On the other hand, the auxiliary machine 12b is an auxiliary machine configured to operate at a voltage (for example, 48 V) higher than that of the auxiliary machine 12a and a blower can be illustrated as auxiliary machines other than the sensor and the actuator. The auxiliary machine 12b is connected to the second power supply path p4 through a power path p6 and can receive the power supply from both the high power battery 21 and the low power battery 22.

The power supply system P2 is further provided, in the power path p6, with a DC/DC converter 31 configured to convert an output voltage of the battery unit 2, specifically a voltage stepped-down by the converter 24 or a voltage of the low power battery 22, to an operation voltage of the auxiliary machine 12b. The converter 31 is configured as a boost converter. The auxiliary machine 12b receives the supply of a voltage stepped-down by the converter 24 and further boosted by the converter 31 from the high power battery 21 or a voltage boosted by the converter 31 from the low power battery 22 according to the state of the switchers (first relay R1, second relay R2).

In this embodiment, a "first auxiliary machine" is configured by the auxiliary machine 12a and a "second auxiliary machine" is configured by the auxiliary machine 12b. Furthermore, a "third voltage converter" is configured by the DC/DC converter 31.

The controller 101 may be configured in the same manner as in the first embodiment and carries out the power source switching control according to the same procedure as that illustrated in FIG. 3 to switch the power supply source to the auxiliary machines 12a, 12b between the high power battery 21 and the low power battery 22.

Thus, the converter 31 is interposed between the battery unit 2 and the auxiliary machine 12b, so that a voltage after stepped-down by the converter 24 or a voltage of the low power battery 22 can be applied to the auxiliary machine 12b after boosted by the converter 31, whereby the operation of a blower, for example, as the auxiliary machine 12b having a relatively high voltage is enabled and, even when the power supply by the high power battery 21 is not possible, the power source to the blower can be secured.

Third Embodiment

Figure 5:
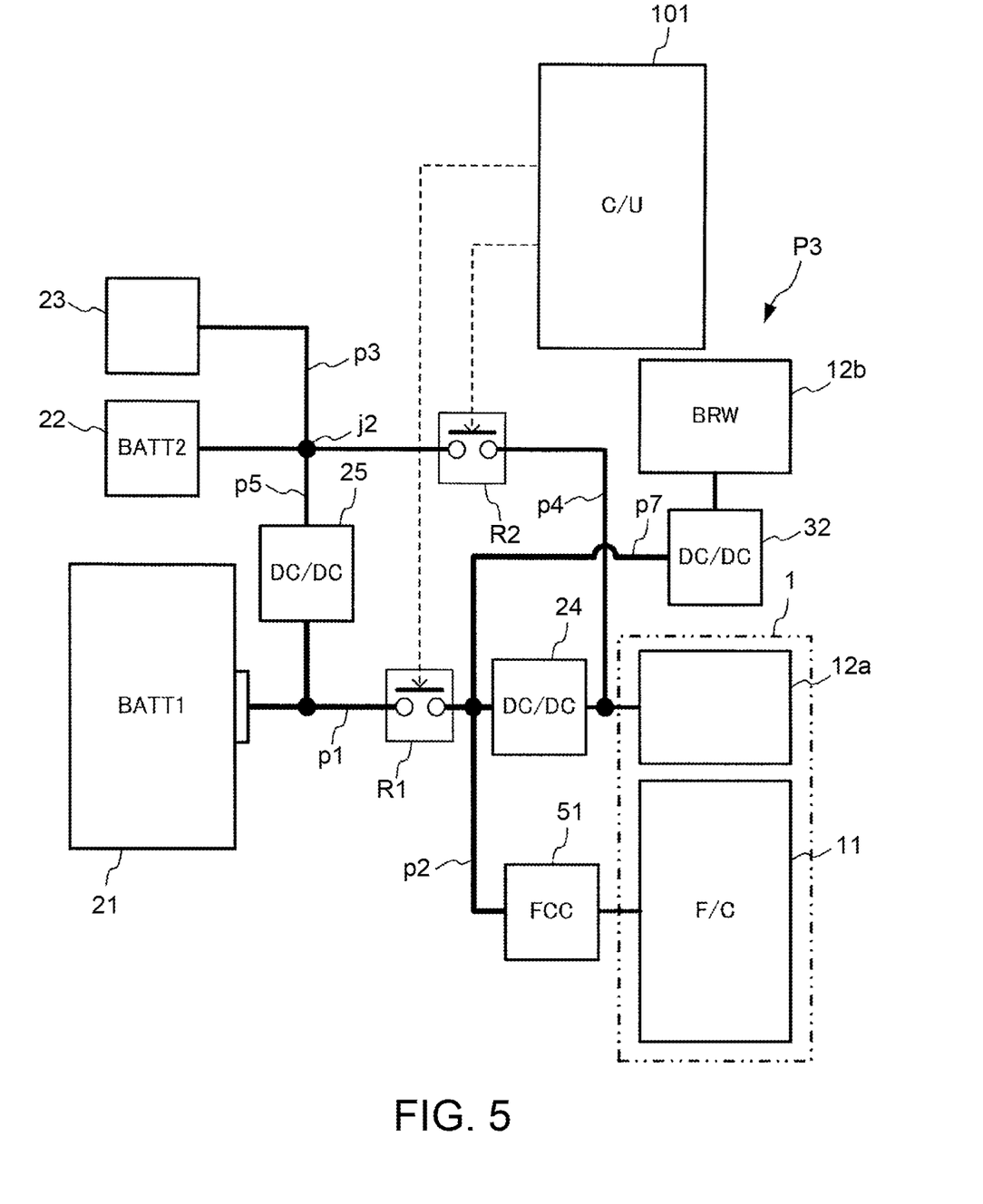
FIG. 5 is a schematic view illustrating the configuration of a power supply system according to a third embodiment of the present invention.

FIG. 5 is a schematic view illustrating the configuration of a power supply system P3 according to a third embodiment of the present invention.

The power supply system P3 is provided with a plurality of auxiliary machines 12a and 12b configured to operate at different voltages, e.g., the auxiliary machine 12a configured to operate at a relatively low voltage (for example, 14 V) and the auxiliary machine 12b (for example, a blower) configured to operate at a voltage (for example, 48 V) higher than that of the auxiliary machine 12a in the same manner as in the second embodiment. The power connection of the battery unit 2 to the auxiliary machine 12a is the same as that in the first embodiment. The auxiliary machine 12a is in a state of being connected to the high power battery 21 through the first power supply path p1 and being connected to the low power battery 22 through the second power supply path p4. In contrast thereto, the auxiliary machine 12b is not connected to the second power supply path p4 but is connected to the first power supply path p1 through a power path p7 and connected to the high power battery 21 through the first power supply path p1.

The power supply system P3 is further provided, in the power path p7, with a DC/DC converter 32 configured to convert a voltage of the high power battery 21 or a voltage (for example, 400 V) after boosted by the converter 51 to an operation voltage of the auxiliary machine 12b. The converter 32 is configured as a step-down converter. The auxiliary machine 12b receives the supply of a voltage after stepped-down by the converter 32 from the high power battery 21 when the high power battery 21 is selected as the power source to the auxiliary machine 12 of the fuel cell 1 (in other words, when the first relay R1 is in an ON state).

In this embodiment, the "first auxiliary machine" is configured by the auxiliary machine 12a and the "second auxiliary machine" is configured by the auxiliary machine 12b. Furthermore, a "fourth voltage converter" is configured by the DC/DC converter 32.

The controller 101 may be configured in the same manner as in the first embodiment and carries out the power source switching control according to the same procedure as that illustrated in FIG. 3 to switch the power supply source to the auxiliary machines 12a, 12b between the high power battery 21 and the low power battery 22.

Thus, the high power battery 21 and the auxiliary machine 12b are connected by the power path p7 in which the converter 32 is interposed not through the converter 24, so that a voltage of the high power battery 21 can be applied to the auxiliary machine 12b after stepped-down by the converter 32, whereby a voltage of the high power battery 21 can be directly converted to an operation voltage of the auxiliary machine 12b by the converter 32 without performing the step-down by the converter 24. Therefore, a loss of the energy required for the step-down can be avoided as compared with a case of performing the step-down by the converter 24. Thus, the size of the converter 24 is reduced, the cost required for the entire system is reduced, and also the size can be made compact.

In the description above, the auxiliary machine 12b configured to operate at a voltage higher than that of the first auxiliary machine (auxiliary machine 12a) is adopted as the "second auxiliary machine", the "second auxiliary machine" may be one configured to operate at a voltage lower than that of the first auxiliary machine.

Furthermore, in the description above, the controller 101 is configured as a system controller configured to integrally control the operations of the fuel cell 1, the battery unit 2, the power control unit 3, and the like. However, the configuration is not limited thereto and the functions possessed by the controller 101, e.g., the functions possessed by the controller 101 with respect to the operations of the fuel cell 1 and the battery unit 2, are distributed into a plurality of controllers, so that the controller 101 can be configured as a combination of a fuel cell controller configured to control the operation of the fuel cell 1 and a battery controller configured to control the operation of the battery unit 2. In this case, the fuel cell controller can be included in the auxiliary machine 12 of the fuel cell 1 or the auxiliary machine 12a having a low operation voltage.

As described above, the embodiments of the present invention are described but the embodiments merely illustrate some application examples of the present invention and do not intend to limit the technical scope of the present invention to the specific configurations of the embodiments. The embodiments described above can be variously altered and modified within the scope of the matter described in Claims.

The invention claimed is:

1. A power supply system,
the power supply system being a power supply system of a vehicle, the power supply system comprising:
a fuel cell; and
a battery unit connected to the fuel cell,
wherein the battery unit is provided with
a first battery connected to the fuel cell so as to supply power to an auxiliary machine of the fuel cell and to be able to be charged with generated power of the fuel cell,
a second battery connected to the auxiliary machine of the fuel cell through a path different from a path of the first battery so as to be able to supply power, the second battery being connected to the first battery via a first voltage converter so as to be able to be charged with discharge power of the first battery, and
a switcher configured to switch a power supply source to the auxiliary machine of the fuel cell between the first battery and the second battery, wherein the first battery forms a system output of the power supply system and drives a traveling motor by the system output,
the power supply system further comprises a controller configured to control an operation of the switcher, and
the controller switches the power supply source to the second battery during charge of the first battery or at occurrence of a failure in the first battery.

2. The power supply system according to claim 1, wherein
the first battery stores power supplied to the traveling motor of the vehicle, and
the second battery stores power supplied to a vehicle auxiliary machine other than the traveling motor.

3. The power supply system according to claim 1, wherein
the first voltage converter also functions as a blocker capable of selectively blocking electrical connection between the first battery and the second battery.

4. The power supply system according to claim 3, wherein
the first voltage converter is configured to convert the voltage of the first battery to a charge voltage of the second battery on a power path connecting the first battery and the second battery.

5. The power supply system according to claim 1, wherein
the battery unit is provided with a second voltage converter configured to convert the voltage of the first battery to an operation voltage of the auxiliary machine of the fuel cell on a power path connecting the first battery and the auxiliary machine of the fuel cell.

6. The power supply system according to claim 5, further comprising:
a first auxiliary machine and a second auxiliary machine configured to operate at a voltage different from a voltage of the first auxiliary machine as the auxiliary machine of the fuel cell, and
a third voltage converter configured to convert an output voltage of the battery unit to an operation voltage of the second auxiliary machine provided between the battery unit and the second auxiliary machine.

7. The power supply system according to claim 5, further comprising:
a first auxiliary machine and a second auxiliary machine configured to operate at a voltage different from a voltage of the first auxiliary machine as the auxiliary machine of the fuel cell, and
an additional voltage converter configured to convert the voltage of the first battery to an operation voltage of the second auxiliary machine provided on a power path connecting the first battery and the second auxiliary machine, wherein
the battery unit is connected to the fuel cell so as to be able to apply an output voltage of the battery unit to the first auxiliary machine,
the first battery is connected to the second auxiliary machine so as to be able to supply power not through the second voltage converter.

8. The power supply system according to claim 6, wherein
the second auxiliary machine operates at a voltage higher than a voltage of the first auxiliary machine.

9. The power supply system according to claim 1, wherein
the controller determines whether supply of power from the first battery to the auxiliary machine of the fuel cell is possible,
when the supply of the power is possible, the first battery is set as the power supply source, and
when the supply of the power is not possible, the second battery is set as the power supply source.

10. The power supply system according to claim 9, wherein
the controller controls the operation of the switcher at a start of the fuel cell to switch the power supply source to the auxiliary machine of the fuel cell.

11. The power supply system according to claim 9, wherein
the controller determines that supply of power from the first battery is not possible during charge of the first battery or at occurrence of a failure in the first battery, and then sets the second battery as the power supply source.

12. A power supply system, comprising:
a fuel cell;
a first battery configured to store power supplied to a traveling motor of a vehicle;
a second battery configured to store power supplied to a vehicle auxiliary machine other than the traveling motor, the second battery being connected to the first battery via a first voltage converter so as to be able to be charged with discharge power of the first battery;
a first power supply path disposed so as to be able to apply a voltage of the first battery to an auxiliary machine of the fuel cell;
a second power supply path disposed so as to be able to apply a voltage of the second battery to the auxiliary machine of the fuel cell;
a switcher configured to switch a power supply path to the auxiliary machine of the fuel cell between the first and second power supply paths; and
a controller configured to control an operation of the switcher,
wherein
the first battery forms a system output of the power supply system and drives the traveling motor by the system output, and
the controller switches the power supply path to the second power supply path during charge of the first battery or at occurrence of a failure in the first battery.

13. An operation method of a power supply system,
the power supply system comprising batteries and a fuel cell, wherein
the batteries are provided with a first battery driving a traveling motor of a vehicle and a second battery different from the first battery, the second battery being connected to the first battery via a first voltage converter so as to be able to be charged with discharge power of the first battery, and the first battery forms a system output of the power supply system and drives the traveling motor by the system output,
the operation method comprising:
starting the fuel cell according to a state of the first battery and charging the first battery with generated power of the fuel cell;
at a start of the fuel cell,
determining whether supply of power by the first battery is possible,
supplying the power to an auxiliary machine of the fuel cell using the first battery as a power source when the supply of the power is possible,
supplying power to the auxiliary machine of the fuel cell using the second battery as the power source when the supply of the power is not possible, and
supplying power to the auxiliary machine of the fuel cell using the second battery as the power source during charge of the first battery or at occurrence of a failure in the first battery.

14. The power supply system according to claim 7, wherein
the second auxiliary machine operates at a voltage higher than a voltage of the first auxiliary machine.

* * * * *